125,041

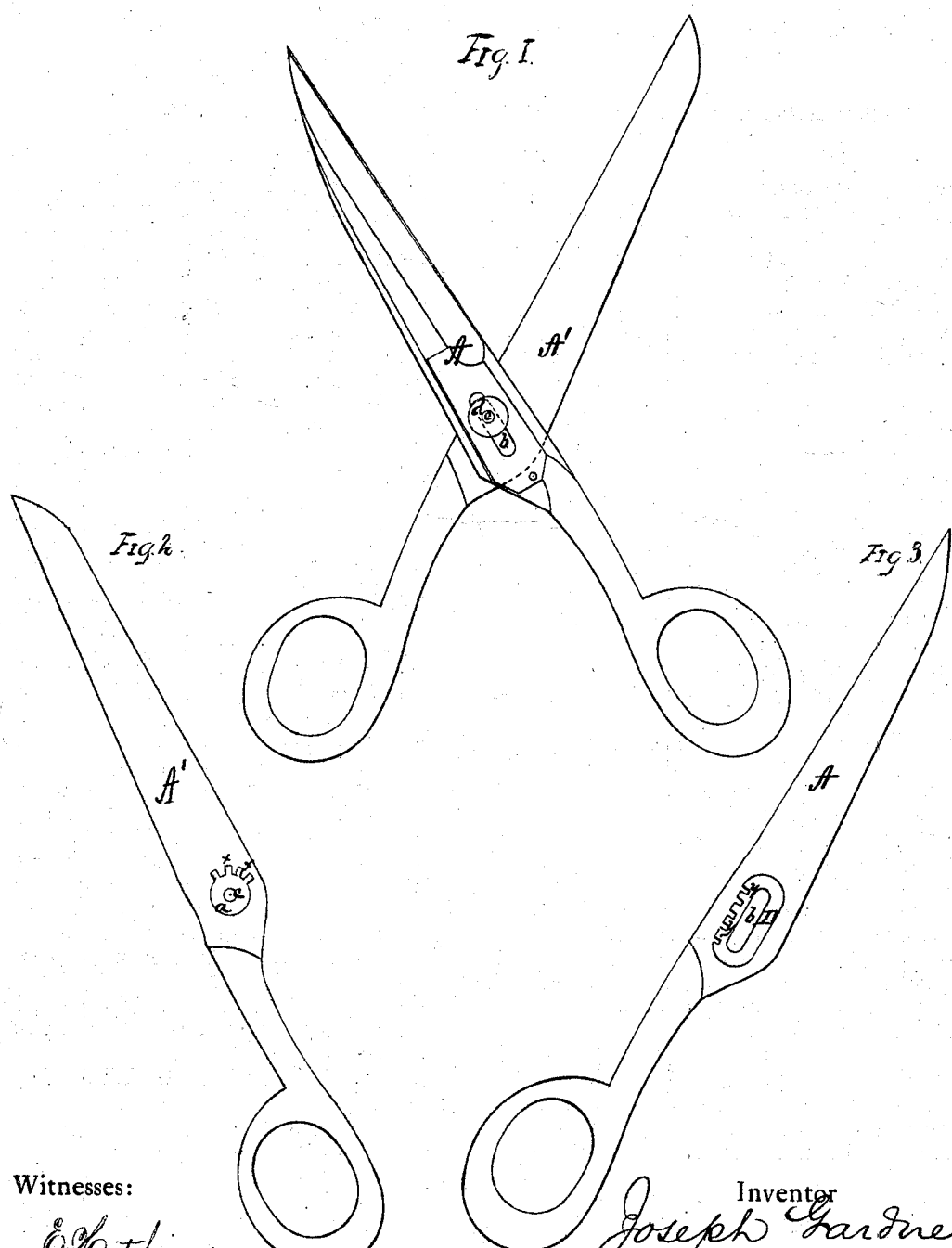

UNITED STATES PATENT OFFICE.

JOSEPH GARDNER, OF LOUISVILLE, KENTUCKY.

IMPROVEMENT IN SHEARS.

Specification forming part of Letters Patent No. 125,041, dated March 26, 1872.

*To all whom it may concern:*

Be it known that I, JOSEPH GARDNER, of Louisville, in the county of Jefferson and State of Kentucky, have invented certain new and useful Improvements in Shears; and do hereby declare that the following is a full, clear, and exact description thereof, reference being had to the accompanying drawing and to the letters of reference marked thereon making a part of this specification.

The nature of my invention consists in the construction of a pair of shears of any form or size, whereby a sliding or eccentric cut is derived, as will be more fully hereinafter set forth.

The object of this sliding cut is to enable the operator to separate the parts of very thin material, such as tissue-paper, fine linens, &c., or to cut thick hard material, such as heavy cloth, leather, tin, or even copper or other metals.

In order to enable those skilled in the art to which my invention appertains to make and use the same, I will now proceed to describe its construction and operation, referring to the annexed drawing, in which—

Figure 1 is a side view of my shears, and Figs. 2 and 3 are detached views of the two parts of the shears.

A A' represent the two parts of a pair of scissors constructed in the ordinary manner and of any suitable size. The lower section A', on its inner face, is provided with a stationary circular metal disk, $a$, at the pivot-point, which disk is provided with cogs $x$ on its circumference, and from its central portion extends a small threaded stud or pivot-pin, $c$, as shown. The inner portion of the outer section A, at the pivot-point, is recessed in an oblong oval manner, D, and the lower edge of said recess has a series of teeth, $y$, corresponding in number and size with the number and size of the teeth on the disk $a$ of the section A'. Through the recess D is cut an oblong slot, $b$, and when the parts A A' are placed together the stud $c$ on the disk $a$ of the section A' passes through the slot, and is there secured by a suitable nut, $d$, on the outside of the section A. It will be seen that the outer section A is placed on the lower section A', so that the recess D lies over the disk $a$, the teeth of said disk taking into the teeth in the recess.

In the operation of cutting, the outer section of the shears turns on a circle on the disk $a$ and pivot $c$, the slot $b$ in the recess D moving on the stud, so that the section A goes forward through the material on the section A' in a sliding manner to form a draw-cut.

A pair of shears thus constructed can be cheaply made, and will be found extremely useful.

In some cases it may be found preferable to extend the stud through the lower section A', the said section being provided with a slot corresponding with the slot in the section A for this purpose. In this case a nut or other suitable fastening will be required on the lower end.

Having thus fully described my invention, what I claim as new, and desire to secure by Letters Patent, is—

The shear-section A', provided with the toothed disk $a$ and stud $c$, in combination with the section A provided with the slotted and toothed recess D, the parts being secured together by a nut, and constructed to operate substantially as set forth.

In testimony that I claim the foregoing I have hereunto set my hand this 20th day of January, 1872.

JOSEPH GARDNER.

Witnesses:
 EDM. F. BROWN,
 C. L. EVERT.